United States Patent
Berkcan et al.

(10) Patent No.: US 9,909,443 B2
(45) Date of Patent: Mar. 6, 2018

(54) PASSIVE WIRELESS SENSORS FOR TURBOMACHINES AND METHOD OF OPERATING THE SAME

(71) Applicant: General Electric Company, Schenectady, NY (US)

(72) Inventors: Ertugrul Berkcan, Clifton Park, NY (US); Yongjae Lee, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 287 days.

(21) Appl. No.: 14/598,526

(22) Filed: Jan. 16, 2015

(65) Prior Publication Data

US 2016/0209264 A1 Jul. 21, 2016

(51) Int. Cl.
| | |
|---|---|
| G01H 1/00 | (2006.01) |
| F01D 21/00 | (2006.01) |
| G01H 13/00 | (2006.01) |
| G01M 99/00 | (2011.01) |
| F01D 17/02 | (2006.01) |
| F01D 17/20 | (2006.01) |

(52) U.S. Cl.
CPC ............. *F01D 21/00* (2013.01); *F01D 17/02* (2013.01); *F01D 17/20* (2013.01); *F01D 21/003* (2013.01); *G01H 13/00* (2013.01); *G01M 99/00* (2013.01); *Y02T 50/672* (2013.01)

(58) Field of Classification Search
CPC ........ F01D 21/003; F01D 17/02; F01D 17/20; F01D 21/00; G01M 15/14; G01H 13/00; G01H 1/006

USPC ...................................................... 73/112.01
See application file for complete search history.

(56) References Cited

U.S. PATENT DOCUMENTS

| | | | |
|---|---|---|---|
| 6,974,641 B1 | 12/2005 | Choy et al. | |
| 7,231,180 B2 | 6/2007 | Benson et al. | |
| 7,368,827 B2* | 5/2008 | Kulkarni | ................. F01D 15/10 290/52 |
| 7,510,776 B2 | 3/2009 | Choy et al. | |

(Continued)

OTHER PUBLICATIONS

Cunha M et al.,"Wireless acoustic wave sensors and systems for harsh environment applications", Wireless Sensors and Sensor Networks (WiSNet), 2011 IEEE Topical Conference on, pp. 41-44, Jan. 16-19, 2011, Phoenix, AZ.

(Continued)

*Primary Examiner* — Freddie Kirkland, III
(74) *Attorney, Agent, or Firm* — Nitin N. Joshi

(57) ABSTRACT

A machine includes a machine substrate and a dielectric layer formed over at least a portion of the machine substrate. A monitoring system for the machine includes a sensor subsystem that includes a first portion of the machine substrate and a portion of the machine dielectric layer formed over the first portion of the machine substrate. The monitoring system also includes a sensor electromagnetic structure disposed on the portion of the machine dielectric layer. The sensor electromagnetic structure includes at least one sensor conducting subcomponent. The sensor electromagnetic structure is configured to regulate electromagnetic fields incident thereto in response to at least one measurement characteristic of a machine measurand. The sensor subsystem is configured to obtain at least one measurement characteristic of the machine measurand proximate a machine sensing position.

24 Claims, 6 Drawing Sheets

(56) References Cited

U.S. PATENT DOCUMENTS

| | | | |
|---|---|---|---|
| 7,618,712 B2* | 11/2009 | Sabol | C23C 4/18 428/210 |
| 8,136,988 B2* | 3/2012 | Geren | G01K 1/024 374/137 |
| 8,173,266 B2 | 5/2012 | Choy et al. | |
| 8,486,545 B2 | 7/2013 | Lanning et al. | |
| 8,519,866 B2* | 8/2013 | Mitchell | H04Q 9/00 340/870.01 |
| 8,568,026 B2* | 10/2013 | Gregory | F01D 17/085 29/601 |
| 8,599,082 B2 | 12/2013 | Mitchell et al. | |
| 8,629,783 B2* | 1/2014 | Mitchell | G01D 3/036 330/289 |
| 8,718,979 B2 | 5/2014 | Berkcan et al. | |
| 8,742,944 B2* | 6/2014 | Mitchell | F01D 17/02 340/870.01 |
| 8,868,355 B2* | 10/2014 | Huang | G01B 7/16 702/188 |
| 8,924,182 B2* | 12/2014 | Berkcan | G01D 21/00 702/182 |
| 9,071,888 B2* | 6/2015 | Subramanian | F01D 5/12 |
| 9,086,266 B2* | 7/2015 | Berkcan | G01B 7/16 |
| 9,194,250 B1* | 11/2015 | Tralshawala | F01D 17/04 |
| 9,350,319 B2* | 5/2016 | Mitchell | G01N 29/2462 |
| 9,494,490 B2* | 11/2016 | Tralshawala | F01D 17/04 |
| 2011/0040498 A1 | 2/2011 | Huang et al. | |
| 2013/0311130 A1* | 11/2013 | Horton | F01D 17/02 702/142 |
| 2013/0332011 A1* | 12/2013 | Ziarno | G05B 23/0213 701/3 |
| 2014/0052410 A1* | 2/2014 | Tralshawala | F01D 17/04 702/183 |
| 2015/0128707 A1* | 5/2015 | Viikari | G01H 13/00 73/584 |

OTHER PUBLICATIONS

U.S. Appl. No. 14/840,975, filed Sep. 1, 2015, entitled Passive Wireless Sensors for Turbomachines and Method of Operating the Same.

Karim, H. et al., "Concept and model of a metamaterial based passive wireless temperature sensor for harsh environment applications", Sensors Journal, IEEE Xplore, vol. PP, Issue: 99, pp. 1, Oct. 15, 2014.

Gomes, R.P.N. et al., "A hybrid sensor network for the real-time condition monitoring of rotating machinery", Distributed Computing in Sensor Systems Workshops (DCOSSW), 2010 6th IEEE International Conference on, IEEE Xplore, pp. 1-2, Jun. 21-23, 2010, Conference Location : Santa Barbara, CA.

* cited by examiner

PASSIVE WIRELESS SENSORS FOR TURBOMACHINES AND METHOD OF OPERATING THE SAME

BACKGROUND

The field of the disclosure relates generally to passive wireless sensors and, more particularly, to passive wireless sensors for turbomachines.

At least some known turbomachines, i.e., gas turbine engines compress air via a plurality of rotatable compressor blades and ignite a fuel-air mixture in a combustor to generate combustion gases that are channeled through rotatable turbine buckets via a hot gas path. Also, at least some other known turbomachines, i.e., steam turbine engines channel steam through rotatable buckets via a steam path. Such known turbomachines convert thermal energy of the combustion gas stream and steam, respectively, to mechanical energy used to rotate a turbine shaft. Output of the turbomachines may be used to power a machine, for example, an electric generator, a compressor, or a pump.

Many of these known turbomachines include known sensing devices that are configured to withstand high temperatures and the stresses and strains associated with high-velocity rotational effects for only a short period of time, i.e., 100 hours or less. Some of such known sensing devices include measurement instruments coupled to, within a gas turbine, for example, compressor blades and turbine buckets. Such known coupled devises typically require extensive wiring, modifications to the blades and buckets to accommodate the wiring, and complicated slip ring configurations. These features are necessary, due to the rotational operation of the monitored components, to transmit measurement data from the blades and buckets to an external data storage and analysis unit. Therefore, such measurement systems increase construction and maintenance costs.

Other known wireless sensing devices are deposited on blades and buckets through a printing process. Yet other known wireless sensing devices are formed in layers on the surfaces of the rotatable components. Moreover, other known wireless sensing devices are embedded within the rotatable components, e.g., inserted into slots defined within the components during manufacturing. These four methods of coupling, i.e., affixing sensors to the rotatable components require addition of at least some of the sensor components to the rotatable components subsequent to manufacture of such rotatable components. As such, these methods lend themselves to adoption by non-original equipment manufacturers (OEMs). Moreover, post-manufacture affixing of portions of the sensing devices to the rotatable components has a potential for not fully integrating the sensors with the rotatable components. In addition, the most appropriate or desired position on the rotatable components for affixing devices may not be available.

BRIEF DESCRIPTION

In one aspect, a monitoring system for a machine is provided. The machine includes a machine substrate and a dielectric layer formed over at least a portion of the machine substrate. The monitoring system for the machine includes a sensor subsystem that includes a first portion of the machine substrate and a portion of the machine dielectric layer formed over the first portion of the machine substrate. The monitoring system also includes a sensor electromagnetic structure disposed on the portion of the machine dielectric layer. The sensor electromagnetic structure includes at least one sensor conducting subcomponent. The sensor electromagnetic structure is configured to regulate electromagnetic fields incident thereto in response to at least one measurement characteristic of a machine measurand. The sensor subsystem is configured to obtain at least one measurement characteristic of the machine measurand proximate a machine sensing position.

In a further aspect, a method of operating a machine including a monitoring system is provided. The method includes generating, with a reader subsystem, an electromagnetic field proximate a sensor subsystem, thereby illuminating a sensor conducting subcomponent with the electromagnetic field. The method also includes regulating the electromagnetic field with the sensor subsystem in response to changes of at least one measurement characteristic of a machine measurand as determined through a machine dielectric layer extending over a portion of a first portion of a machine substrate. The method further includes sensing changes in the regulated electromagnetic field at the reader subsystem and transmitting signals representative of the changes in the regulated electromagnetic field to a reader processor.

In another aspect, a turbomachine is provided. The turbomachine includes at least one rotatable component including a first substrate and a first dielectric layer formed over at least a portion of the first substrate. The turbomachine also includes at least one stationary component including a second substrate and a second dielectric layer formed over at least a portion of the second substrate. The at least one stationary component is proximate the at least one rotatable component. The turbomachine further includes a sensor subsystem including a sensor electromagnetic structure disposed on the first dielectric layer. The sensor electromagnetic structure includes at least one sensor conducting subcomponent. The sensor electromagnetic structure is configured to regulate electromagnetic fields incident thereto in response to at least one measurement characteristic of a measurand of the at least one rotatable component. The sensor subsystem is configured to obtain the at least one measurement characteristic of the measurand of the at least one rotatable component.

DRAWINGS

These and other features, aspects, and advantages of the present disclosure will become better understood when the following detailed description is read with reference to the accompanying drawings in which like characters represent like parts throughout the drawings, wherein.

Figure 1:
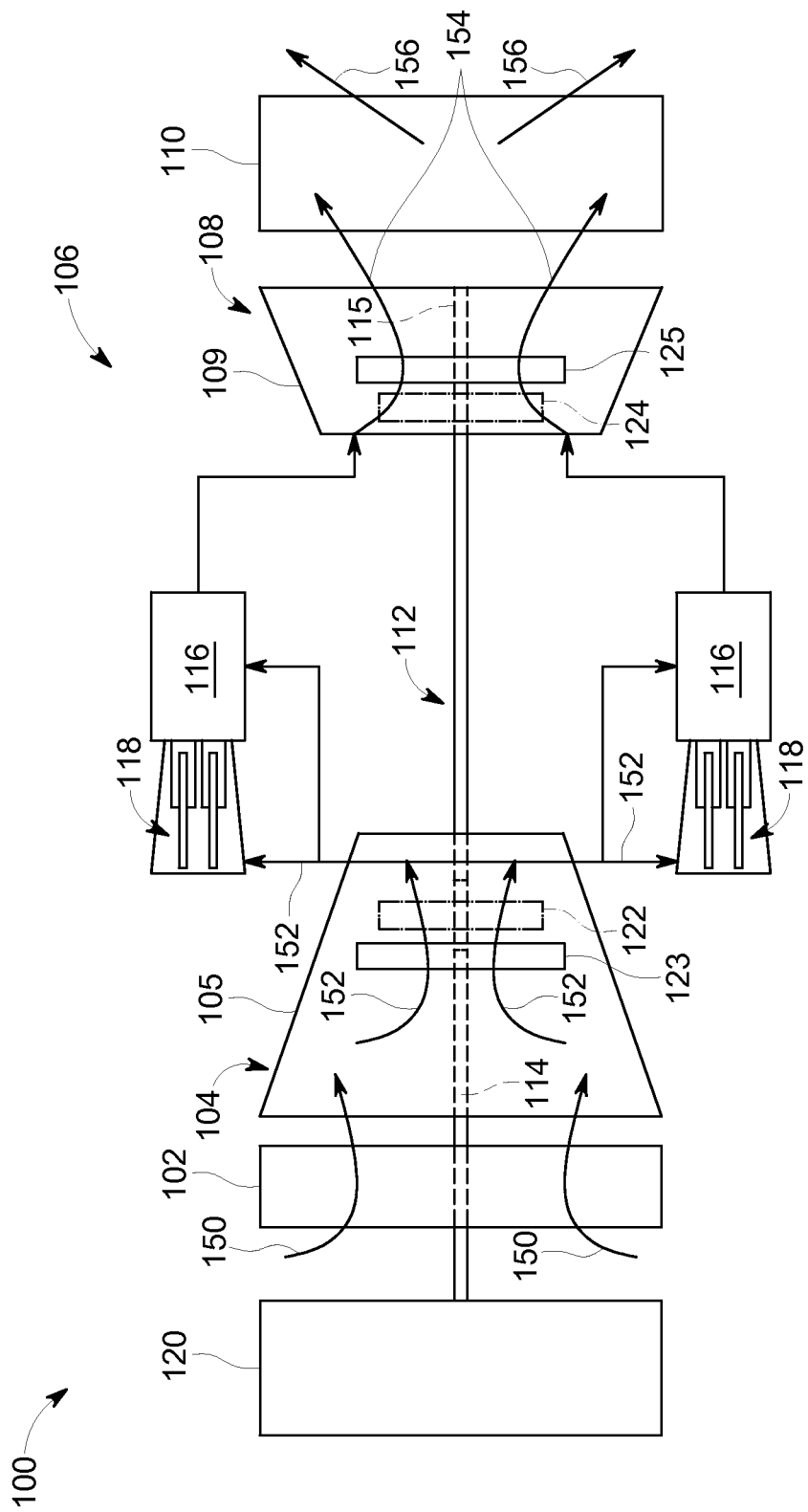
FIG. 1 is schematic diagram of an exemplary turbomachine, i.e., a gas turbine engine.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The integrated sensors and associated sensing systems described herein facilitate extended operation in harsh environments. Specifically, integrating a significant portion of sensing system components in rotatable components during the manufacture of such rotatable components reduces the amount of time and resources expended in preparing the rotatable components for insertion into the respective turbomachine after they are manufactured. Also, such integration of the sensors and rotatable components facilitates using portions of the rotatable components as sensing system components. Further, such integration of the sensors and rotatable components will increase the hurdles to non-OEM (original equipment manufacturer) entities for attempted duplication. In addition, such integration of the sensors and rotatable components facilitates placing the sensor components at the most appropriate and desired positions on the rotatable components.

FIG. 1 is a schematic view of a rotary machine 100, i.e., a turbomachine, and more specifically, a turbine engine. In the exemplary embodiment, turbine engine 100 is a gas turbine engine. Alternatively, turbine engine 100 is any other turbine engine and/or rotary machine, including, without limitation, a steam turbine engine, an aircraft engine, a wind turbine, and a compressor. In the exemplary embodiment, gas turbine engine 100 includes an air intake section 102, and a compressor section 104 that is coupled downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Turbine engine 100 is enclosed within a turbine casing 109 and includes an exhaust section 110 that is downstream from turbine section 108. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a load 120 via drive shaft 114. For example, load 120 may include, without limitation, an electrical generator and/or a mechanical drive application, e.g., a pump. Alternatively, gas turbine engine 100 may be an aircraft engine. In the exemplary embodiment, compressor section 104 includes at least one compressor blade assembly 122, i.e., blade 122 and at least one adjacent stationary vane assembly 123.

Also, in the exemplary embodiment, turbine section 108 includes at least one turbine blade assembly, i.e., bucket 124 and at least one adjacent stationary nozzle assembly 125. Each compressor blade assembly 122 and each turbine bucket 124 is coupled to rotor assembly 112, or, more specifically, compressor drive shaft 114 and turbine drive shaft 115.

In operation, air intake section 102 channels air 150 towards compressor section 104. Compressor section 104 compresses inlet air 150 to higher pressures and temperatures prior to discharging compressed air 152 towards combustor section 106. Compressed air 152 is channeled to fuel nozzle assembly 118, mixed with fuel (not shown), and burned within each combustor 116 to generate combustion gases 154 that are channeled downstream towards turbine section 108. Combustion gases 154 generated within combustors 116 are channeled downstream towards turbine section 108. After impinging turbine bucket 124, thermal energy is converted to mechanical rotational energy that is used to drive rotor assembly 112. Turbine section 108 drives compressor section 104 and/or load 120 via drive shafts 114 and 115, and exhaust gases 156 are discharged through exhaust section 110 to ambient atmosphere.

Figure 2:
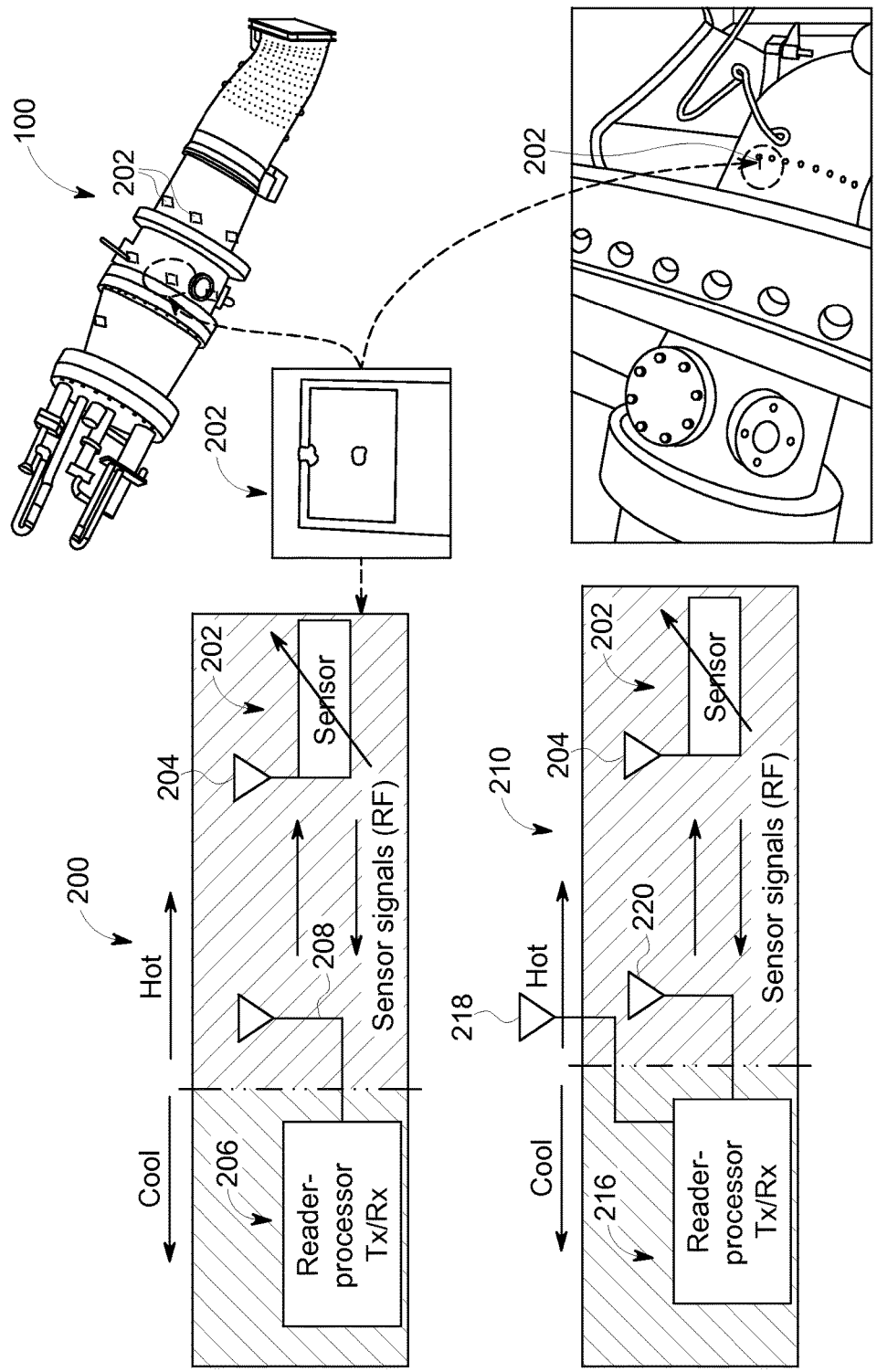
FIG. 2 is a schematic view of an exemplary monitoring system that may be used with the gas turbine engine shown in FIG. 1.

FIG. 2 is a schematic view of an exemplary monitoring system 200 that may be used with gas turbine engine 100. Monitoring system 200 includes at least one sensor subsystem 202 coupled to one of compressor blade 122 and turbine bucket 124. In the exemplary embodiment, sensor subsystem 202 is a printed sensor positioned on non-planar metallic surfaces using maskless patterning and manufacturing with no electronic components embedded thereon. Sensor subsystem 202 is configured to withstand substantially constant exposure to a harsh environment, such harsh environment may include, without limitation, high-temperature compressed air in excess of 100 degrees Celsius (° C.) (212 degrees Fahrenheit (° F.)), high-temperature combustion gases in excess of 260° C. (500° F.), and significant rotational forces induces by rotational velocities of approximately 3000 revolutions per minute (rpm) to approximately 3600 rpm.

Also, in the exemplary embodiment, each sensor subsystem 202 includes a mechanism that facilitates providing each sensor subsystem 202 with a unique identifier such that unique identification of each compressor blade 122 and each turbine bucket 124 is facilitated through associated sensor subsystem 202 coupled thereto. Moreover, sensor subsystem 202 is passive, i.e., it includes no on-board power supplies and is in a dormant condition until it is illuminated as described below. Each sensor subsystem 202 includes a radio frequency (RF) sensor antenna device 204 (discussed further below).

Further, in the exemplary embodiment, monitoring system 200 includes a reader subsystem 206. Reader subsystem 206 is coupled to a stationary portion of gas turbine engine 100. In the exemplary embodiment, reader subsystem 206 is printed and positioned on non-planar metallic surfaces using maskless patterning and manufacturing with no electronic components embedded thereon. Reader subsystem 206 is configured to withstand substantially constant exposure to a harsh environment, such harsh environment may include, without limitation, high-temperature environments in excess of 100° C. (212° F.) and the standard vibrational conditions associated with gas turbine engines. Reader subsystem 206 includes a monostatic RF reader antenna device 208 (discussed further below) that facilitates transceiver functionality. Alternative embodiments, e.g., and without limitation, alternative monitoring system 210 includes and alternative reader subsystem 216 with a first bistatic reader antenna, i.e., a RF transmitter antenna 218 and a second bistatic reader antenna, i.e., a RF receiver antenna 220.

In addition to the turbomachines described above, monitoring system 200 any also be used with any machine and any equipment that enables operation of system 200 as described herein, including, without limitation, a gas turbine combustor, a gas turbine transition piece, and any high temperature area.

Figure 3:
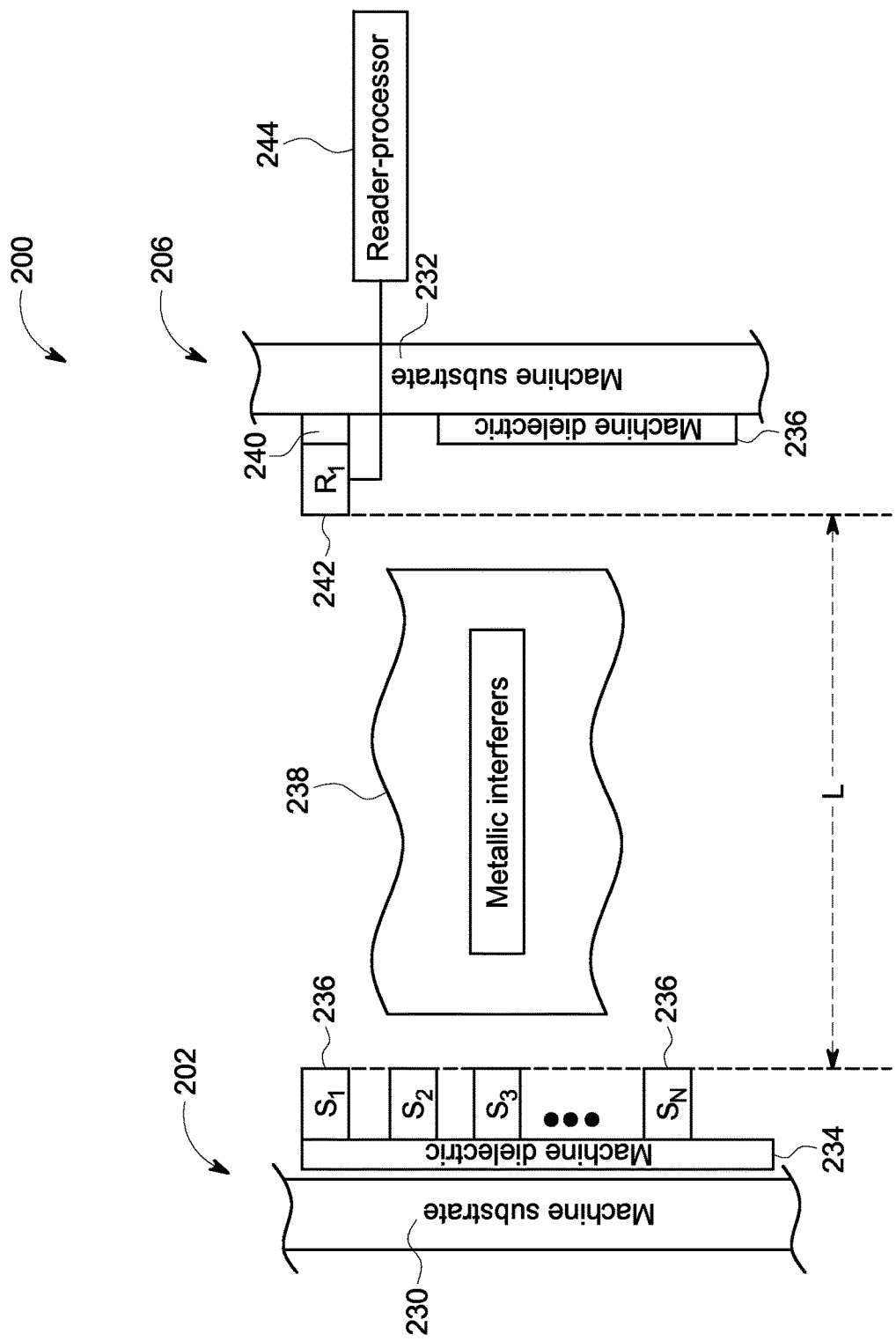
FIG. 3 is a schematic view of the monitoring system shown in FIG. 2.

FIG. 3 is a schematic view of monitoring system 200 for use with gas turbine engine 100 (shown in FIGS. 1 and 2). As described above, monitoring system 200 includes a sensor subsystem 202 and a reader subsystem 206 operatively in wireless communication with each other. Gas turbine engine 100 includes a plurality of machine substrates, i.e., a first, or bucket substrate 230 and a second, or casing substrate 232. In alternative embodiments, first machine substrate 230 is a portion of any translational component of any machine and second machine substrate 232 is a portion of any stationary component of any machine. As such, sensor subsystem 202 includes a portion of bucket substrate 230 and reader subsystem 206 includes a portion of casing substrate 232. Substrates 230 and 232 are maintained at substantially ground potential. As such, substrates 230 and 232 are integral to gas turbine engine 100, and therefore, sensor subsystem 202 and reader subsystem 206 are integral to gas turbine engine 100, i.e., specifically, turbine bucket assembly 124 and turbine casing 109, respectively (both shown in FIG. 1). Substrates 230 and 232 are formed from materials, including one or more of, and without limitation, any electrically conductive material, a metal, a carbon fiber, a metal of high magnetic permeability, a metal matrix composite, a ceramic matrix composite, and a cermet.

Sensor subsystem 202 also includes at least a portion of a machine dielectric layer 234 formed over a least a portion of bucket substrate 230. In the exemplary embodiment, machine dielectric layer 234 is a thermal barrier coating (TBC) including, without limitation, one or more of yttria-stabilized zirconia, a high-temperature ceramic material, alumina, aluminum oxide, forsterite, spinel, mullite, corderite, glass, silicon dioxide, and barium strontium titanate. As such, machine dielectric layer 234 is an integral portion of both gas turbine engine 100 and sensor subsystem 202. Also, in the exemplary embodiment, machine dielectric layer 234 facilitates electrically isolating additional components of sensor subsystem 202 (discussed further below) from bucket substrate 230 (at ground potential) and to represent a change in a measured characteristic of a measurand associated with turbine bucket assembly 124.

As used herein, the term "measurand" refers to a quantity, a quality, a characteristic, and a condition being measured. In the exemplary embodiment, measurands include one or more of, without limitation, temperature, strain, cracking, creep, a hot spot, equipment condition (e.g., off or on), metal temperature, and temperature and condition of machine dielectric 234. Also, as used herein, the term "measurement characteristics" refers to a monitored value or a change of the monitored value of machine dielectric 234, including one or more of, and without limitation, impedance, a dielectric constant, an electrical resistance, capacitance, inductance, impedance, reactance, geometrical parameters, a reflection coefficient, a transmission coefficient, a dissipation factor, a coupling parameter, a gain, a resonant frequency, and a resonant frequency shift.

Therefore, in the exemplary embodiment, machine dielectric 234 is one or more of, and without limitation, a tunable dielectric, a temperature dependent dielectric, a voltage dependent dielectric, and a dielectric with its dissipation characteristics dependent upon temperature.

Sensor subsystem 202 further includes a plurality of sensor subassemblies 236 that are positioned at predetermined sensing positions on machine dielectric 234. Sensor subassemblies 236 obtain the predetermined measurement characteristics in response to the predetermined measurands at the sensing positions. In the exemplary embodiment, there are N sensor subassemblies labeled $S_1$ through $S_N$.

A plurality of metallic interferers 238 are positioned proximate to and between sensor subsystem 202 and reader subsystem 206. Metallic interferers 238 include, without limitation, those objects and features typically found in gas turbine engines such as engine 100. Monitoring system 200 is configured to take into account the signal interference features and characteristics of metallic interferers 238, e.g., and without limitation, known wireless signal reflections and interferences. Such metallic interferers 238 include, without limitation, nozzle assemblies 125 (shown in FIG. 1). In addition, monitoring system 200 is configured to take into account the signal interference features and characteristics of other configuration artifacts and features of engine 100, e.g., and without limitation, cavities defined therein.

In the exemplary embodiment, reader subsystem 206 includes a portion of casing substrate 232. Reader subsystem 206 also includes a reader dielectric layer 240 coupled to and extending over a portion of casing substrate 232. Reader subsystem 206 further includes at least one reader electromagnetic (EM) subassembly 242 coupled to reader dielectric layer 240. Reader subsystem 206 also includes a reader processor 244 coupled to reader EM subassembly 242. Reader processor 244 is configured to determine values for the measurement characteristics of the machine measurand.

Also, in the exemplary embodiment, sensor subassemblies 236 are communicatively coupled with reader EM subassembly 242 with a separation L therebetween in a range between about 10 centimeters (cm) and about 125 cm. Alternatively, separation L extends from near-field to far-field electromagnetic range, i.e., within the range from about 2 wavelengths to about 5 wavelengths.

Figure 4:
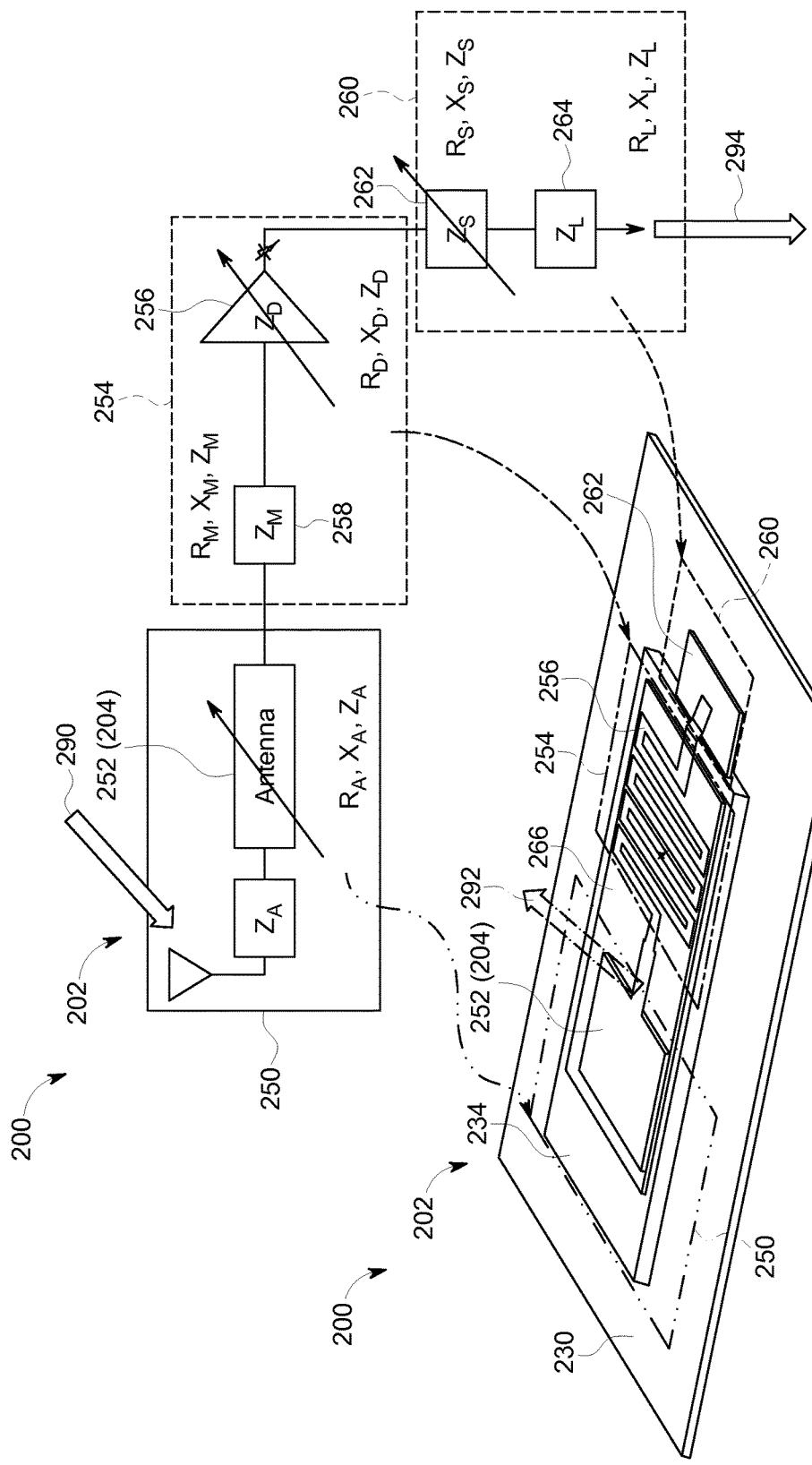
FIG. 4 is a schematic view and a perspective view of an exemplary sensor subsystem that may be used with the monitoring system shown in FIGS. 2 and 3.

FIG. 4 is a schematic view and a perspective view of sensor subsystem 202 that may be used with monitoring system 200. Sensor subsystem 202 includes a sensor electromagnetic (EM) structure 250. Sensor EM structure 250 is disposed on dielectric layer 234 and includes at least one sensor conducting subcomponent 252 (only one shown) that is configured to regulate electromagnetic fields incident thereto (typically from reader EM subassembly 242 (shown in FIG. 3)) in response to at least one measurement characteristic of the machine measurand. Sensor conducting subcomponent 252 is a high-conductivity, low-resistivity device. As such, sensor subsystem 202 is configured to obtain at least one measurement characteristic of the machine measurand proximate the machine sensing position. Sensor conducting subcomponent 252 is formed from materials, including one or more of, without limitation, an electromagnetic energy radiating element, a rectangular microstrip antenna, a patch antenna, a monopole antenna, a planar inverted-F antenna, a quarter-wavelength patch, a dipole antenna, and a spiral antenna. As such, sensor conducting subcomponent 252 is an electromagnetic field-responsive component configured to radiate in close proximity of bucket substrate 230. More specifically, sensor conducting subcomponent 252 acts as an antenna 204 (shown in FIG. 3) configured to be responsive to RF fields, i.e., radiate, receive, and reflect RF fields. Therefore, sensor EM structure 250 has an antenna resistance ($R_A$), an antenna impedance ($X_A$), and an antenna reactance ($Z_A$). While sensor subsystem 202 as shown and described herein includes additional components coupled to sensor EM structure 250, as discussed further below, sensor subsystem 202 with sensor EM structure 250 by itself is sufficient to enable operation of sensor subsystem 202 as described herein.

In the exemplary embodiment, sensor conducting subcomponent 252 is formed from materials that include, without limitation, an electrically conductive material, an electrically conductive layer, an electrically conductive stack, a metal, a high temperature conductor, a platinum layer, and a palladium layer. Also, in the exemplary embodiment, the electrically conductive stack is formed from materials that include, without limitation, a bonding layer, a titanium layer, a zirconium layer, a platinum-rhodium layer, a metal, a high temperature conductor, a platinum layer, and a palladium layer.

Sensor subsystem 202 also includes an optional delay component 254 (shown in phantom) coupled to sensor EM structure 250. Delay component 254 is disposed on dielectric layer 234 and includes at least one sensor conducting subcomponent 256 (only one shown) that is configured to regulate electromagnetic fields incident thereto in response to at least one measurement characteristic of the machine measurand. Sensor conducting subcomponent 256 is coupled to sensor conducting subcomponent 252. Also, sensor conducting subcomponent 256 is an electromagnetic field-responsive component configured to radiate in close proximity of bucket substrate 230. As such, sensor conducting subcomponent 256 facilitates sensor subsystem 202 obtaining at least one measurement characteristic of the machine measurand proximate the machine sensing position. Sensor conducting subcomponent 256 is formed from materials substantially similar to those of sensor conducting subcomponent 252. Sensor conducting subcomponent 256 differs from sensor conducting subcomponent 252 in that while subcomponent 252 is substantially rectangular, subcomponent 256 is relatively narrow and is configured with a winding path to facilitate delaying electric current transmitted therethrough. Sensor conducting subcomponent 256 has a delay resistance ($R_D$), a delay impedance ($X_D$), and a delay reactance ($Z_D$). Delay component 254 also includes a matching element 258 that facilitates matching impedances between sensor EM structure 250 and delay component 254. Matching element 258 has a matching resistance ($R_M$), a matching impedance ($X_M$), and a matching reactance ($Z_M$). Matching element 258 includes, without limitation, a T-match, an inductively coupled loop, a nested slot, a resistor, a capacitor, an inductor, and a reactive element.

Sensor subsystem 202 further includes an optional sensor component 260 (shown in phantom) coupled to delay component 254. Sensor component 260 is configured to reflect a regulated RF field back toward reader EM subassembly 242. Sensor component 260 is disposed on bucket substrate 230 and includes a sensor element 262. Sensor element 262 is a low-conductivity, high-resistivity device coupled to sensor conducting subcomponent 256. Sensor element 262 is configured to regulate electromagnetic fields incident thereto in response to at least one measurement characteristic of the machine measurand. Also, sensor element 262 is an electromagnetic field-responsive component configured to radiate in close proximity of bucket substrate 230. As such, sensor element 262 facilitates sensor subsystem 202 obtaining at least one measurement characteristic of the machine measurand proximate the machine sensing position. Sensor element 262 has a sensor resistance ($R_S$), a sensor impedance ($X_S$), and a sensor reactance ($Z_S$). Sensor element 262 is formed from low-conductivity, high-resistivity materials, including one or more of, without limitation, nickel, indium tin oxide, and barium strontium titanate.

Sensor component 260 also includes a loading element 264 representative the effective sum of loads the RF field will interact with in sensor subsystem 202. Loading element 264 has an effective load resistance ($R_L$), an effective load impedance ($X_L$), and an effective load reactance ($Z_L$). The components that may be included in the effective sums include, without limitation, and in any combination of series and parallel, a modulating block, an impedance, a switch, a passive component, a resistive element, a capacitive element, an inductive element, and a reactive element.

As described above, matching element 258 facilitates matching impedances between sensor EM structure 250 and delay component 254. In addition, for those embodiments that do not include a sensor conducting subcomponent 256, matching element 258 facilitates matching impedances between sensor EM structure 250 and loading element 264.

Sensor element 262 and loading element 264 are shown in FIG. 4 as coupled in series. Alternatively, sensor element 262 and loading element 264 are coupled in parallel. Also, delay component 254 and sensor component 260 are shown in FIG. 4 as separate components. Alternatively, delay component 254 and sensor component 260 are combined into a single component.

In the exemplary embodiment, sensor component 260 does not include machine dielectric layer 234. In some embodiments, sensor component 260 includes a reference dielectric sub-component. The reference dielectric sub-component operates in a manner similar to machine dielectric layer 234. The reference dielectric sub-component is formed from materials that include, without limitation, yttria-stabilized zirconia, a high-temperature ceramic material, alumina, aluminum oxide, forsterite, spinel, mullite, corderite, glass, silicon dioxide, barium strontium titanate, a tunable dielectric, temperature driven dielectric, and voltage dependent dielectric, where the associated dielectric loss is dependent upon temperature.

As described above, sensor conducting subcomponent 252, sensor conducting subcomponent 256, and sensor element 262 are configured to regulate electromagnetic fields incident thereto in response to at least one measurement characteristic of the machine measurand. Also, sensor conducting subcomponent 252, sensor conducting subcomponent 256, and sensor element 262 are electromagnetic field-responsive components configured to radiate in close proximity of bucket substrate 230. As such, sensor conducting subcomponent 252, sensor conducting subcomponent 256, and sensor element 262 facilitate sensor subsystem 202 obtaining at least one measurement characteristic of the machine measurand proximate the machine sensing position. In addition, sensor conducting subcomponent 252, sensor conducting subcomponent 256, and sensor element 262 are configured to obtain reference characteristics insensitive to the measurand of the turbine bucket assembly 124. The purpose of obtaining such reference characteristics includes capturing known noise and interference effects that also vary. Such reference characteristics are typically not sensitive to variations in the measurement characteristics of the measurands, but are sensitive to noise and interference variations. Once the noise and interference variations are captured, an associated predetermined variance associated with those noise and interference variations are applied to the measurement characteristics collected to remove the noise and interference variations. Such reference characteristics include, without limitation, impedances, impedance changes, geometrical parameters, coupling parameters, dielectric constants, gains, resonant frequencies, resonant frequency shifts, dielectric constants, resistances, capacitances, inductances, reflection coefficients, transmission coefficients, and dissipation factors.

Further, in the exemplary embodiment, sensor subsystem 202 includes a passivation subcomponent 266 configured to protect sensor EM structure 250 and delay component 254 from the remainder of machinery and environmental influences from gas turbine engine 100, including, without limitation, oxidation and reduction reactions associated with bucket substrate 230. Passivation subcomponent 266 is formed from materials that include, without limitation, yttria-stabilized zirconia, a high-temperature ceramic, alumina, aluminum oxide, forsterite, spinel, mullite, corderite, glass, silicon dioxide, barium strontium titanate, a tunable dielectric, temperature dependent dielectric, voltage dependent dielectric, and a dielectric with its dissipation dependent upon temperature.

During manufacture of turbine bucket assembly, sensor subsystem 202 is embedded therein, thereby integrating a significant portion of sensing system 200 components in rotatable components. As such, the amount of time and resources expended in preparing the rotatable components for insertion into the respective turbomachines after they are manufactured is reduced.

Figure 5:
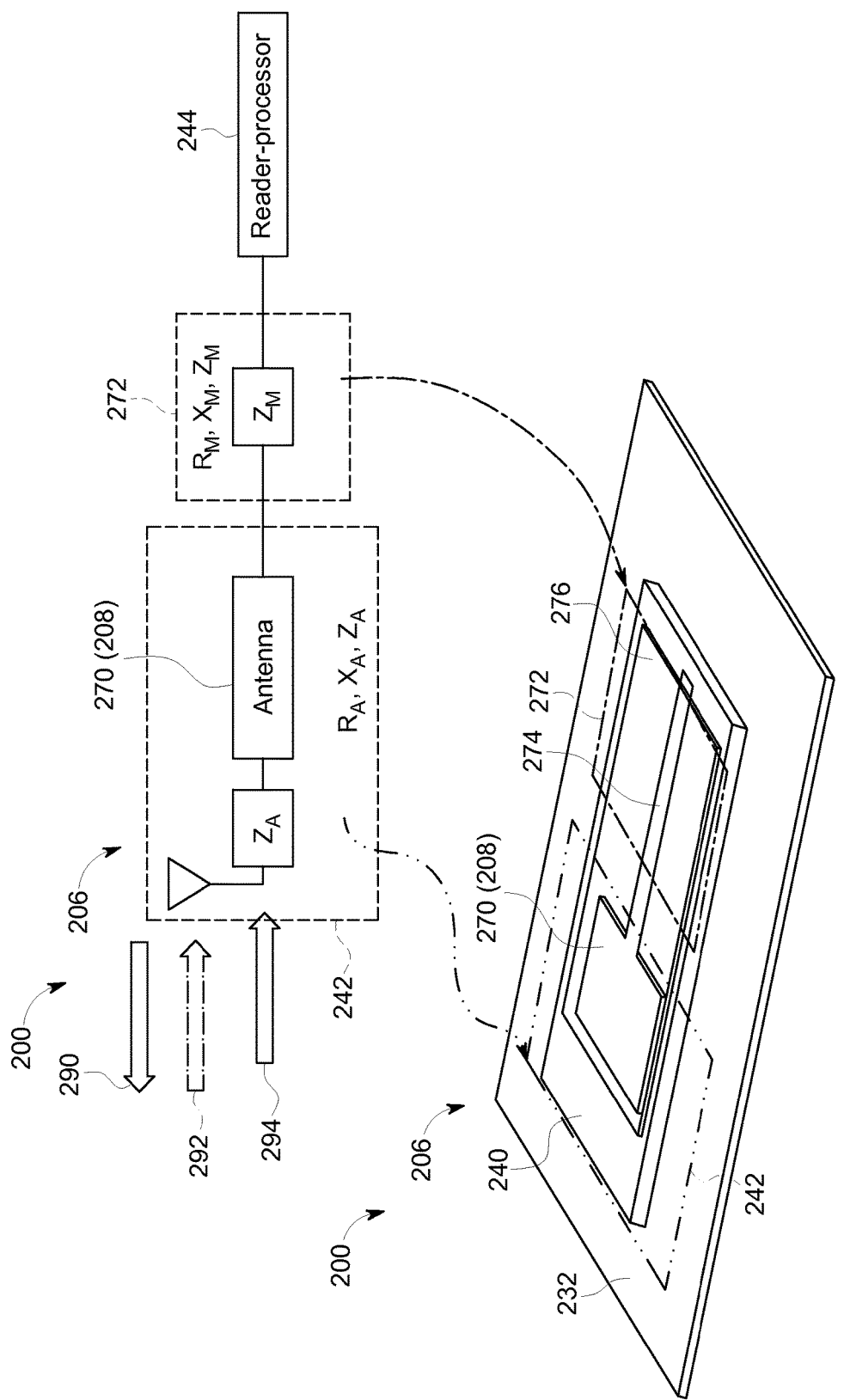
FIG. 5 is a schematic view and a perspective view of an exemplary reader subsystem that may be used with the monitoring system shown in FIGS. 2 and 3.

FIG. 5 is a schematic view and a perspective view of reader subsystem 206 that may be used with monitoring system 200. Reader subsystem 206 is operatively coupled to sensor subsystem 202 (shown in FIG. 4). Reader subsystem 206 includes casing substrate 232. Reader subsystem 206 also includes reader dielectric layer 240 coupled to and extending over a portion of casing substrate 232. Reader dielectric layer 240 is similar to machine dielectric layer 234 (shown in FIG. 4). Reader subsystem 206 further includes at least one reader electromagnetic (EM) subassembly 242 coupled to reader dielectric layer 240.

Reader EM subassembly 242 is disposed on dielectric layer 240 and includes at least one reader conducting subcomponent 270 (only one shown) that is configured to measure electromagnetic fields incident thereto (typically from sensor component 260 or sensor EM structure 250 (both shown in FIG. 4)). Reader EM subassembly 242 is also configured to illuminate sensor subsystem 202 with an RF field. Therefore, reader conducting subcomponent 270 acts as an antenna configured to radiate and receive RF fields. As such, reader conducting subcomponent 270 acts as antenna 208 (shown in FIG. 2). Reader conducting subcomponent 270 is formed from materials similar to those for sensor conducting subcomponent 256. Reader EM structure 242 has an antenna resistance ($R_A$), an antenna impedance ($X_A$), and an antenna reactance ($Z_A$).

Reader conducting subcomponent 270 is illuminated with modified time varying electromagnetic (RF) fields including properties such as, without limitation, a return signal strength, a return signal phase, a return signal timing characteristics, a timing delay, a resonant frequency, a resonant frequency shift, polarization, reflection coefficient, backscatter ratio, radar cross section, and absorption.

Reader subsystem 206 also includes a matching element 272 that facilitates matching impedances between reader conducting subcomponent 270 and reader processor 244. Matching element 272 is similar to matching element 258 (shown in FIG. 4) and has a matching resistance ($R_M$), a matching impedance ($X_M$), and a matching reactance ($Z_M$).

Reader subsystem 206 also includes reader processor 244 coupled to matching element 272. Reader processor 244 determines values for the measurement characteristics of the machine measurand based on at least one property of the regulated electromagnetic fields as described above. More specifically, reader processor 244 determines the measurand of the bucket substrate 230 independent of error sources including, without limitation, power level shifts, reader power shifts, ambient temperature, ambient moisture, and changes to conditions external to the operation of the equipment. Matching element 272 includes a conducting subcomponent 274 coupled to, and similar to, reader conducting subcomponent 270. Reader subsystem 206 also includes a passivation subcomponent 276 similar to passivation subcomponent 266 (shown in FIG. 4).

Figure 6:
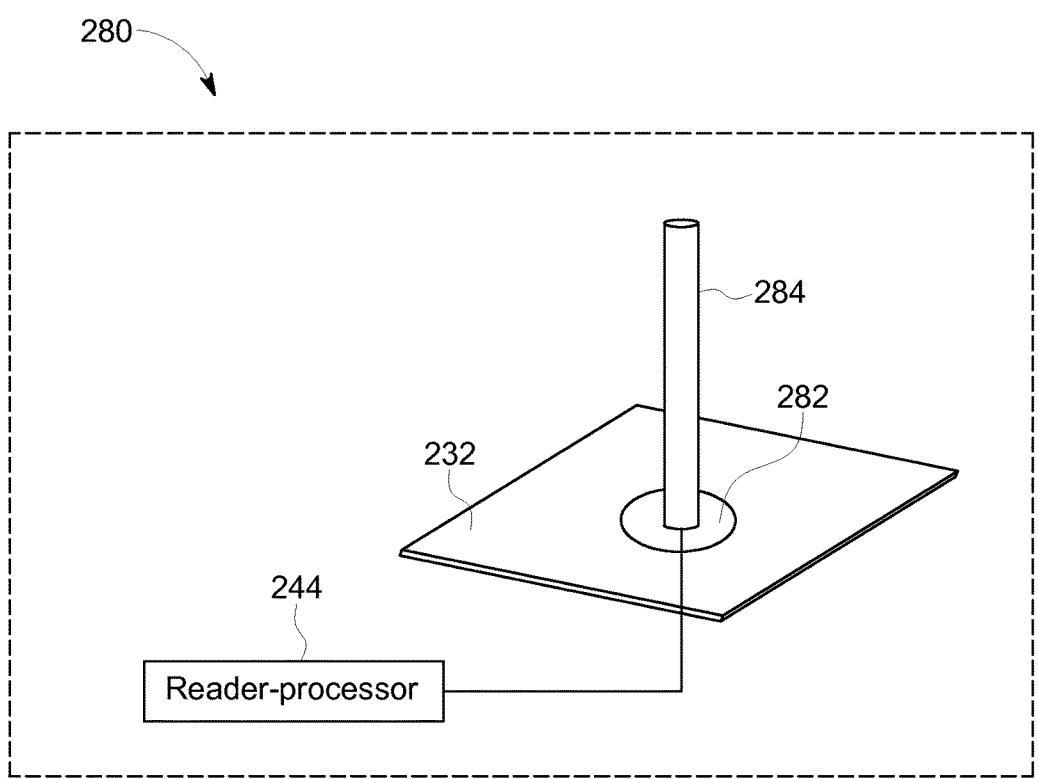
FIG. 6 is a schematic perspective view of an alternative reader subsystem that may be used with the monitoring system shown in FIGS. 2 and 3.

FIG. 6 is a schematic perspective view of an alternative reader subsystem 280 that may be used with monitoring system 200 (shown in FIGS. 2 and 3). Reader subsystem 280 includes a portion of casing substrate 232 and a circular reader dielectric layer 282 disposed thereon. A substantially cylindrical reader conducting subcomponent 284 extends from dielectric layer 282. Subcomponent 284 and dielectric layer 282 have any shape that enables operation of reader subsystem 280 as described herein, including, without limitation, a helical subcomponent 284. In this alternative embodiment, reader subsystem 280 has a substantially monopole configuration, where reader conducting sub-component 284 is a simple conductor perpendicular to casing substrate 232 and reader dielectric 282 is used, at least partially, to electrically isolate reader conducting sub-component 284 from casing substrate 232. Reader dielectric 282, in some embodiments, is air.

Referring to FIGS. 2, 3, 4, and 5, in operation of gas turbine engine 100 and monitoring system 200, reader subsystem 206 generates an electromagnetic field 290 in a predetermined portion of the RF spectrum proximate sensor subsystem 202, thereby illuminating sensor conducting subcomponent 252 with electromagnetic field 290. Specifically, reader processor 244 (or, any other controller) commands reader conducting subcomponent 270 to energize and to operate reader EM subassembly 242 as a radiating antenna. Reader EM subassembly 242 illuminates sensor conducting subcomponent 252 and sensor EM structure 250 operates as an antenna.

In the exemplary embodiment, electromagnetic field 290 is generated as a series of pulses with a predetermined frequency within a predetermined wideband range of the RF frequency spectrum, the wideband range of the RF frequency spectrum including predetermined resonant frequencies of sensor subsystem 202. Alternatively, electromagnetic field 290 is generated with time-varying frequencies that sweep through a range of frequencies that encompass predetermined resonant frequencies of sensor subsystem 202. The frequency is within the range between approximately 100 kiloHertz (kHz) and approximately 10 gigaHertz (GHz). In alternative embodiments, the frequency range extends from 3 kHz to 300 GHz.

Also, in the exemplary embodiment, electromagnetic field 290 induces fringing fields (not shown) in sensor conducting subcomponent 252 that are at least partially representative of the measured characteristic of the measurand. Specifically, these fringing fields induce a voltage between sensor conducting subcomponent 252 and substrate 230 (at ground potential) and a current in sensor conducting subcomponent 252 with a resonant frequency that is different than the frequency of electromagnetic field 290, such resonant frequency representative of the measured characteristic of the measurand. The band of resonant frequencies is narrower than the frequency range of field 290, therefore, only that portion of field 290 with frequencies close to the center frequency of the resonant frequency range excite sensor conducting subcomponent 252, the other frequencies are essentially blocked, and sensor subsystem acts as a narrow band filter. Dielectric layer 234 has a measurand-dependent dielectric constant that facilitates generating the resonant frequencies and the change in the dielectric constant and/or dielectric loss due to a change in the measurand induces the corresponding change in resonant frequency. As such, electromagnetic field 290 is regulated by sensor subsystem 202 in response to changes of at least one measurement characteristic of a machine measurand as determined through machine dielectric layer 234 extending over a portion of substrate 230.

For those embodiments with a sensor EM structure 250 and no delay component 254 and no sensor component 260, a reflected EM field 292 at the resonant frequency is sent to reader EM subassembly 242.

For those embodiments with delay component 254 and sensor component 260, matching element 258 facilitates matching the impedances of sensor EM structure 250 with delay component 254 and sensor component 260 as the current is transmitted from sensor EM structure 250 to delay component 254. Also, sensor conducting subcomponent 256 facilitates sensing the change in the measurand in a manner similar to sensor conducting subcomponent 252. The signal at the resonant frequency is transmitted from sensor conducting subcomponent 256 to sensor element 262. Sensor element 262 facilitates sensing the change in the measurand in a manner similar to sensor conducting subcomponent 252 and the signal at the resonant frequency generates an electromagnetic field 294 that is reflected back to reader EM subassembly 242.

EM subassembly 242 generates voltage and current signals at the resonant frequency that is transmitted to reader processor 244 that senses the changes in the regulated electromagnetic field. Reader processor 244 includes sufficient algorithms and instructions programmed therein to generate signals representative of values of the at least one measurement characteristic of the machine measurand and transmit the signals representative of values of the at least one measurement characteristic to at least one of a recording device and an indicating device.

Monitoring system 200 facilitates remote monitoring for, without limitation, a condition based maintenance system, a structural monitoring program, an operational control system for the machinery, an instrumentation schema, an engineering development verification, a product verification, and hot gas path sensing.

The above-described integrated sensors and associated sensing systems facilitate extended operation in harsh environments. Specifically, integrating a significant portion of sensing system components in rotatable components during the manufacture of such rotatable components reduces the amount of time and resources expended in preparing the rotatable components for insertion into the respective turbomachine after they are manufactured. Also, such integration of the sensors and rotatable components facilitates using portions of the rotatable components as sensing system components. Further, such integration of the sensors and rotatable components will increase the hurdles to non-OEM (original equipment manufacturer) entities for attempted duplication. In addition, such integration of the sensors and rotatable components facilitates placing the sensor components at the most appropriate and desired positions on the rotatable components.

An exemplary technical effect of the methods, systems, and apparatus described herein includes at least one of: (a) integrating a significant portion of sensing system components in rotatable components during the manufacture of such rotatable components, thereby reducing the amount of time and resources expended in preparing the rotatable components for insertion into the respective turbomachines after they are manufactured; (b) using portions of the rotatable components as sensing system components, thereby decreasing the number of additional sensing system components to be added to the rotatable components; (c) increasing the hurdles to non-OEM entities for attempted duplication; (d) facilitating placement of the sensor components at the most appropriate and desired positions on the rotatable components; (e) positioning sensors in harsh environments that do not have delicate chip features, thereby facilitating more robust sensing devices; (f) providing sensors that embedded within the associated components during manufacture and are not affixed to their associated components subsequent to manufacturing of those components, thereby facilitating sturdier sensing devices; and (g) facilitating passive operation of a machine sensor in a wireless environment.

Exemplary embodiments of methods, systems, and apparatus for operating turbomachines are not limited to the specific embodiments described herein, but rather, components of systems and/or steps of the methods may be utilized independently and separately from other components and/or steps described herein. For example, the methods, systems, and apparatus may also be used in combination with other systems requiring a monitoring of components in harsh environments, and the associated methods, and are not limited to practice with only the systems and methods as described herein. Rather, the exemplary embodiment can be implemented and utilized in connection with many other applications, equipment, and systems that may benefit from using passive wireless sensors tightly integrated with the components they monitor.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system for a machine, the machine including a machine substrate and a dielectric layer formed over at least a portion of the machine substrate, said monitoring system comprising a sensor subsystem comprising:
   a first portion of said machine substrate;
   a portion of said machine dielectric layer formed over said first portion of said machine substrate; and
   a plurality of sensor subassemblies positioned at predetermined sensing positions on the dielectric layer, wherein each of the sensor subassembly includes a sensor electromagnetic structure disposed on said portion of said machine dielectric layer, said sensor electromagnetic structure comprising at least one sensor conducting subcomponent, said sensor electromagnetic structure configured to regulate electromagnetic fields incident thereto in response to at least one measurement characteristic of a machine measurand, said sensor subsystem configured to obtain at least one measurement characteristic of the machine measurand proximate a machine sensing position.

2. The monitoring system in accordance with claim 1, wherein said sensor subsystem further comprises:
   a delay component coupled to said sensor electromagnetic structure; and
   a sensor component coupled to said delay component.

3. The monitoring system in accordance with claim 2, wherein said sensor component comprises a loading element and said at least one sensor subsystem further comprises a matching element coupled to said sensor electromagnetic structure and said loading element, said matching element configured to facilitate impedance matching between said loading element and said sensor electromagnetic structure.

4. The monitoring system in accordance with claim 3, wherein said sensor component is an electromagnetic field-responsive component configured to radiate in close proximity of said first portion of said machine substrate.

5. The monitoring system in accordance with claim 4, wherein said electromagnetic field-responsive component and said loading element are coupled in series or are in parallel.

6. The monitoring system in accordance with claim 1 further comprising a reader subsystem operatively coupled to said sensor subsystem, said reader subsystem comprising:
   a second portion of said machine substrate;
   at least one reader electromagnetic subassembly comprising at least one reader conducting subcomponent configured to measure the regulated electromagnetic fields; and
   a reader processor coupled to said at least one reader electromagnetic subassembly, said reader processor configured to determine values for the measurement characteristics of the machine measurand based on at least one property of the regulated electromagnetic fields.

7. The monitoring system in accordance with claim 6, wherein said reader subsystem further comprises a reader dielectric layer coupled to said second portion of said machine substrate.

8. The monitoring system in accordance with claim 6, wherein said reader subsystem further comprises a passivation subcomponent configured to at least partially protect said reader electromagnetic subassembly from environmental conditions including oxidation and reduction reactions within the machine.

9. The monitoring system in accordance with claim 6 further comprising a plurality of metallic interferers positioned proximate said at least one reader electromagnetic subassembly and proximate said sensor electromagnetic structure.

10. The monitoring system in accordance with claim 6, wherein:
   said at least one reader conducting subcomponent defines at least one reader antenna configured to transmit energy in the radio-frequency (RF) spectrum to said sensor electromagnetic structure and at least one reader antenna configured to receive energy in the RF spectrum from said sensor component; and
   said at least one sensor conducting subcomponent defines a sensor antenna configured to respond to the RF energy transmitted from said reader electromagnetic subassembly.

11. The monitoring system in accordance with claim 10, wherein said at least one reader antenna comprises one of:
   a first bistatic reader antenna configured to transmit energy in the RF spectrum to said sensor electromagnetic structure and a second bistatic reader antenna configured to receive energy in the RF spectrum from said sensor component; and
   a monostatic reader antenna configured to both transmit energy in the RF spectrum to said sensor electromagnetic structure and receive energy in the RF spectrum from said sensor component.

12. The monitoring system in accordance with claim 6, wherein said sensor subsystem and said reader subsystem are separated by a distance, wherein the distance is in a range between about 10 centimeters (cm) and about 125 cm.

13. The monitoring system in accordance with claim 6, wherein said sensor subsystem and said reader subsystem are separated by a distance, wherein the distance is in a range between about 2 wavelengths to about 5 wavelengths.

14. The monitoring system in accordance with claim 1, wherein said sensor subsystem further comprises a passivation subcomponent configured to at least partially protect said sensor electromagnetic structure from environmental conditions within the machine.

15. The monitoring system in accordance with claim 1, wherein said machine dielectric layer is formed from materials including one or more of yttria-stabilized zirconia, a high-temperature ceramic material, alumina, aluminum oxide, forsterite, spinel, mullite, corderite, glass, silicon dioxide, and barium strontium titanate.

16. A method of operating a machine including a monitoring system, said method comprising:
   generating, with a reader subsystem, an electromagnetic field proximate a sensor subsystem, thereby illuminating a sensor conducting subcomponent with the electromagnetic field;
   regulating the electromagnetic field with the sensor subsystem in response to changes of at least one measurement characteristic of a machine measurand as determined through a machine dielectric layer extending over a portion of a first portion of a machine substrate, wherein the sensor subsystem is disposed on the machine dielectric layer;
   sensing changes in the regulated electromagnetic field at the reader subsystem; and
   transmitting signals representative of the changes in the regulated electromagnetic field to a reader processor;
   wherein the reader subsystem is printed and positioned on a non-planar metallic surface using maskless patterning and manufacturing with no electronic components embedded thereon.

17. The method in accordance with claim 16, wherein transmitting signals representative of the changes in the regulated electromagnetic field to a reader processor comprises:
   generating signals representative of values of the at least one measurement characteristic of the machine measurand within the reader processor; and
   transmitting the signals representative of values of the at least one measurement characteristic to at least one of a recording device and an indicating device.

18. The method in accordance with claim 16, wherein generating an electromagnetic field proximate a sensor subsystem comprises generating the electromagnetic field with a predetermined frequency within a predetermined portion of the radiofrequency (RF) spectrum.

19. The method in accordance with claim 18, wherein generating the electromagnetic field with a predetermined frequency comprises generating the electromagnetic field with a frequency within a predetermined wideband range of the RF frequency spectrum, the wideband range of the RF frequency spectrum including predetermined resonant frequencies of the sensor subsystem.

20. The method in accordance with claim 18, wherein generating the electromagnetic field with a predetermined frequency comprises generating the electromagnetic field with time-varying frequencies that sweep through a range of frequencies that encompass predetermined resonant frequencies of the sensor subsystem.

21. A turbomachine comprising:
   at least one rotatable component comprising a first machine substrate and a first dielectric layer formed over at least a portion of said first substrate;
   at least one stationary component comprising a second substrate and a second dielectric layer formed over at least a portion of said second substrate, said at least one stationary component proximate said at least one rotatable component; and
   a sensor subsystem comprising a plurality of sensor subassemblies positioned at predetermined sensing positions on the first dielectric layer, wherein each of the sensor subassembly includes a sensor electromagnetic structure, said sensor electromagnetic structure comprising at least one sensor conducting subcomponent, said sensor electromagnetic structure configured to regulate electromagnetic fields incident thereto in response to at least one measurement characteristic of a measurand of said at least one rotatable component, said sensor subsystem configured to obtain the at least one measurement characteristic of the measurand of said at least one rotatable component.

22. The turbomachine in accordance with claim 21, wherein said at least one sensor subsystem further comprises:
- a delay component coupled to said sensor electromagnetic structure; and
- a sensor component coupled to said delay component.

23. The turbomachine in accordance with claim 21 further comprising a reader subsystem operatively coupled to said sensor subsystem, wherein said second dielectric layer comprises a reader dielectric layer, said reader subsystem comprising:
- at least one reader electromagnetic subassembly coupled to said reader dielectric layer, said at least one reader electromagnetic subassembly comprising at least one reader conducting subcomponent, said at least one reader electromagnetic subassembly configured to measure the regulated electromagnetic fields; and
- a reader processor coupled to said at least one reader electromagnetic subassembly, said reader processor configured to determine values for the measurement characteristics of the measurand of said at least one rotatable component based on at least one property of the regulated electromagnetic fields.

24. The turbomachine in accordance with claim 23, wherein:
- said at least one reader conducting subcomponent defines at least one reader antenna configured to transmit energy in the radio-frequency (RF) spectrum to said sensor electromagnetic structure and at least one reader antenna configured to receive energy in the RF spectrum from said sensor component; and
- said at least one sensor conducting subcomponent defines a sensor antenna configured to respond to the RF energy transmitted from said reader electromagnetic subassembly.

* * * * *